(12) United States Patent
Jensen et al.

(10) Patent No.: US 9,360,302 B2
(45) Date of Patent: Jun. 7, 2016

(54) FILM THICKNESS MONITOR

(71) Applicants: Earl Jensen, Santa Clara, CA (US);
Kevin O'Brien, Menlo Park, CA (US);
Farhat Quli, Union City, CA (US); **Mei
Sun**, Los Altos, CA (US)

(72) Inventors: Earl Jensen, Santa Clara, CA (US);
Kevin O'Brien, Menlo Park, CA (US);
Farhat Quli, Union City, CA (US); **Mei
Sun**, Los Altos, CA (US)

(73) Assignee: KLA-Tencor Corporation, Milpitas, CA (US)

(*) Notice: Subject to any disclaimer, the term of this patent is extended or adjusted under 35 U.S.C. 154(b) by 0 days.

(21) Appl. No.: 13/679,128

(22) Filed: Nov. 16, 2012

(65) Prior Publication Data

US 2013/0155390 A1    Jun. 20, 2013

Related U.S. Application Data

(60) Provisional application No. 61/576,012, filed on Dec. 15, 2011.

(51) Int. Cl.
*G01N 21/00* (2006.01)
*G01B 11/06* (2006.01)
*G01B 9/02* (2006.01)

(52) U.S. Cl.
CPC ............ *G01B 11/06* (2013.01); *G01B 9/02051* (2013.01); *G01B 11/0625* (2013.01); *G01B 11/0641* (2013.01); *G01B 11/0675* (2013.01); *G01B 11/0683* (2013.01)

(58) Field of Classification Search
CPC .............. G01B 11/06; G01B 11/0625; G01B 11/0641; G01B 11/0683; G01B 9/02051
USPC ......... 356/72, 320, 322, 503, 487, 237.4, 369
See application file for complete search history.

(56) References Cited

U.S. PATENT DOCUMENTS

| 4,957,368 | A | * | 9/1990 | Smith | 356/369 |
| 5,237,392 | A | * | 8/1993 | Hickel et al. | 356/630 |
| 5,624,190 | A | * | 4/1997 | Joseph et al. | 374/161 |
| 5,724,144 | A | * | 3/1998 | Muller | G01B 11/0683 356/632 |
| 6,031,653 | A |   | 2/2000 | Wang | |

(Continued)

FOREIGN PATENT DOCUMENTS

WO       0219438 A    3/2002

OTHER PUBLICATIONS

Yeom et al., "Highly Sensitive Nano-porous Lattice Biosensor Based on Localized Surface Plasmon Resonance and Interference", Oct. 2011, OSA, vol. 19, No. 23.*

(Continued)

*Primary Examiner* — Michael A Lyons
*Assistant Examiner* — Maurice Smith
(74) *Attorney, Agent, or Firm* — Joshua D. Isenberg; JDI Patent

(57) ABSTRACT

A measurement unit comprising a light source and a photodetector may be formed in a cavity in a substrate. The light source produces light that impinges a material layer and is reflected back to the photodetector. Through methods such as interferometry and ellipsometry, the thickness of the material layer may be calculated from the light intensity data measured by the photodetector. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

18 Claims, 5 Drawing Sheets

(56) References Cited

U.S. PATENT DOCUMENTS

| | | | |
|---|---|---|---|
| 6,069,905 A * | 5/2000 | Davis et al. | 372/50.124 |
| 6,368,416 B1 * | 4/2002 | Wong | 134/6 |
| 6,424,418 B2 * | 7/2002 | Kawabata et al. | 356/445 |
| 6,483,585 B1 * | 11/2002 | Yang | 356/369 |
| 6,501,973 B1 * | 12/2002 | Foley et al. | 600/310 |
| 6,566,186 B1 * | 5/2003 | Allman et al. | 438/239 |
| 6,650,415 B2 * | 11/2003 | Aspnes et al. | 356/369 |
| 6,654,132 B1 | 11/2003 | Schietinger et al. | |
| 6,720,177 B2 * | 4/2004 | Ghadiri et al. | 435/287.1 |
| 6,762,849 B1 * | 7/2004 | Rulkens | 356/630 |
| 6,845,184 B1 * | 1/2005 | Yoshimura et al. | 385/14 |
| 6,867,865 B2 * | 3/2005 | Vaupel | 356/445 |
| 6,888,639 B2 * | 5/2005 | Goebel et al. | 356/504 |
| 7,088,448 B1 * | 8/2006 | Hahn et al. | 356/369 |
| 7,158,220 B2 * | 1/2007 | Zhang | 356/51 |
| 7,221,456 B2 * | 5/2007 | Kanai et al. | 356/445 |
| 7,355,720 B1 * | 4/2008 | Carr | G01H 9/004 356/498 |
| 7,411,677 B2 * | 8/2008 | Kawakami et al. | 356/365 |
| 7,482,576 B2 | 1/2009 | Mundt et al. | |
| 7,869,062 B2 * | 1/2011 | Nakazawa et al. | 356/630 |
| 2002/0196431 A1 * | 12/2002 | DeFelice et al. | 356/237.1 |
| 2004/0007326 A1 | 1/2004 | Roche et al. | |
| 2004/0098216 A1 * | 5/2004 | Ye | G01D 9/005 702/127 |
| 2005/0036135 A1 * | 2/2005 | Earthman et al. | 356/237.1 |
| 2005/0073690 A1 * | 4/2005 | Abbink et al. | 356/451 |
| 2005/0083522 A1 * | 4/2005 | Aravanis et al. | 356/317 |
| 2006/0019462 A1 * | 1/2006 | Cheng et al. | 438/400 |
| 2006/0192976 A1 * | 8/2006 | Hall | G01D 5/266 356/505 |
| 2007/0108465 A1 * | 5/2007 | Pacholski et al. | 257/103 |
| 2008/0033705 A1 * | 2/2008 | Bynum et al. | 703/11 |
| 2008/0186477 A1 * | 8/2008 | Wang et al. | 356/73 |
| 2010/0128278 A1 | 5/2010 | Deck et al. | |
| 2010/0177316 A1 * | 7/2010 | So et al. | 356/432 |
| 2010/0330776 A1 * | 12/2010 | Zuniga et al. | 438/455 |
| 2011/0112769 A1 | 5/2011 | Niederberger et al. | |
| 2012/0082413 A1 * | 4/2012 | Alameh et al. | 385/24 |
| 2012/0318966 A1 | 12/2012 | Jensen et al. | |

OTHER PUBLICATIONS

Se-Hyuk Yeom, "Highly sensitive nano-porous lattice biosensor based on localized surface plasmon resonance and interference", Nov. 7, 2011.*

A. S. Jugessur et al . "Compact and integrated 2-D photonic crystal super-prism filter-device for wave length demultiplexing applications", Optical Society of America, Feb. 20, 2006, vol. 14, No. 4.

D.S. Goldman et al. "Miniaturized spectrometer employing planar waveguides and grating couplers for chemical analysis" Applied Optics, vol. 29, Issue 31, pp. 4583-4589 (1990).

N. Pervez et al. "Photonic Crystal Spectrometer", Optics Express, vol. 18, Issue 8, pp. 8277-8285 (2010).

S. Lin and J. G. Fleming, "A Three-Dimensional Optical Photonic Crystal," J. Lightwave Technol. 17, 1944-(1999).

U.S. Appl. No. 61/576,012 entitled "Wireless Etch-Rate Monitor" to Earl Jensen, filed Dec. 15, 2011.

International Search Report and Written Opinion for International Application No. PCT/US2012/069582, dated Apr. 23, 2015.

* cited by examiner

US 9,360,302 B2

FILM THICKNESS MONITOR

PRIORITY CLAIM

This application claims the benefit of priority of U.S. provisional application No. 61/576,012 to Earl Jensen, Kevin O'Brien, and Farhat Quli, entitled WIRELESS ETCH-RATE MONITOR, filed Dec. 15, 2011, the entire disclosures of which are incorporated herein by reference.

FIELD OF THE INVENTION

Aspects of the present disclosure relate to methods and apparatuses for measuring the change of thickness of a material layer and/or the rate of change of the thickness of a material layer in an etching or deposition process. The measurements may be taken in situ without significant modifications to the processing tool.

BACKGROUND OF THE INVENTION

As the size of structures in semiconductor devices and other similarly manufactured devices continue to shrink, the demand for tighter tolerances increase. One way to ensure that fabricated structures meet allowable design tolerances is to have accurate characterizations of the processing tools used in each processing step. The characterization of each processing tool is important, because variation of the processing conditions within a tool may affect the substrate being processed. For example, in etching and material deposition processes it is important to know how the processing conditions will affect the rate of change of the thickness of a material layer. However, even within a single processing tool there may be variations in the rate of change of the thickness of the material. For example, in processes utilizing a plasma, such as plasma enhanced chemical vapor deposition (PECVD), the thickness of a material layer may have a different rate of change in an area proximate to the edge of the substrate compared to an area located near the center of the substrate.

Currently, without invasive modifications to the processing chamber of a tool, only the average rate of change may be calculated. After processing a substrate, the material layer may be measured to determine the total change that occurred. Then the average rate of change may be calculated by dividing the total change in thickness by the total processing time. In order to determine if there are variations across the substrate as a result of the processing, then the measurements and calculation must be performed at multiple locations on the substrate as well. This process may provide information regarding the uniformity of the change in a surface, but it lacks the ability to provide temporal information. In addition to not being able to provide temporal information, this process is time consuming because it requires both a processing operation and a separate measurement operation. Alternative efforts to provide temporal information for the rate of change of a material layer have utilized a laser beam to measure the thickness of a material layer through polarization or spectral reflectance. While this may provide the temporal information, its use if often limited to research facilities due to the extensive modifications needed to the processing chambers.

Therefore, there is a need in the art to provide methods and apparatuses for measuring the rate of change of a material layer while it is being processed without the need for extensive modifications to the processing chamber of the tool.

BRIEF DESCRIPTION OF THE DRAWINGS

Other objects and advantages of the invention will become apparent upon reading the following detailed description and upon reference to the accompanying drawings in which.

DESCRIPTION OF THE SPECIFIC EMBODIMENTS

Figure 1A:
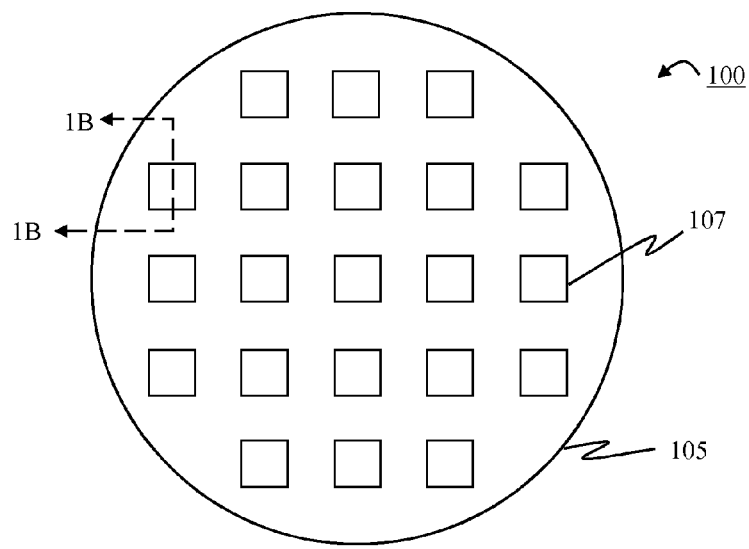
FIG. 1A is an overhead view of a sensor apparatus according to an aspect of the present disclosure.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Aspects of the present disclosure describe methods and apparatuses that may be used for measuring the rate of change of a material layer while it is being processed in a processing tool. The devices described in the present disclosure preferably have a similar size and form factor to substrates that are typically processed in microfabrication facility in order to provide accurate in situ measurements. By way of example, and not by way of limitation, aspects of the present disclosure describe devices with a diameter of 300 mm and a thickness of 0.775 mm. However, it should be noted that both larger and smaller substrates may be used, as may devices with different shapes, such as, but not limited to, squares or rectangles.

The material layer may be any material that may be etched or deposited onto a substrate in a microfabrication process that is also transparent to a range of wavelengths produced by the light source. By way of example, and not by way of limitation, the material layer may be an oxide, a glass, semiconductor, silicon, nitride, polymer, transparent conductor or a photoresist material. The measurements of the material layer may be made by one or more measurement units that are located between a substrate and the material layer. By way of example, and not by way of limitation, the substrate may be a silicon wafer, a glass substrate, or any other suitable substrate used in microfabrication processes. Each measurement unit may include a light source and a photodetector. By way of example, and not by way of limitation, the light source may be a light emitting diode or a laser diode. Thickness of the material layer may be measured with the use of interferometry. The light source emits light towards the material layer. The light impinges on the material layer and reflects back towards the photodetector. The interference between light reflecting from the bottom surface and the top surface of the material layer may be detected by the photodetector. Aspects of the present disclosure may further comprise an optical filter positioned between the material layer and the photodetector in order to selectively detect the interference of only a narrow bandwidth of light. Aspects of the present disclosure may also comprise one or more temperature sensors configured to determine the temperature of the material layer. The temperature sensor allows for additional calibration of the measurements. A processing unit and a memory may also be present in the device. The processor may be configured to analyze the interference pattern detected by the photodetector in order to determine and record the thickness of the material layer. The rate of change of the thickness of the material layer may be determined by initiating a plurality of thickness measurements over the duration of the processing step. The data processing may be performed contemporaneously with the material deposition or removal, or alternatively, the data obtained by the photodetector may be stored in the memory and processed after the substrate has been removed from the processing chamber.

Another additional aspect of the present disclosure describes a device further comprising one or more polarizers and one or more analyzers disposed between the material layer and the one or more measurement units. This configuration allows for the performance of ellipsometry on the material layer in order to provide an alternative method for determining the thickness and the rate of change of the thickness of the material layer during processing.

Additional aspects of the present disclosure further include the use of a reusable cover. The cover may be any material that is transparent to the light source used for the measurement. The cover may be positioned such that the one or more measurement units are between the substrate and the cover. The material layer may then be formed on (or etched from) a top surface of the cover with the cover being located between the one or more measurement units and the material layer. By way of example, the cover may be a glass or sapphire material.

Aspects of the present disclosure describe a light guiding element that may be used to pipe light to each measurement unit from an external light source. The light guiding element may be a fiber optic cable or any other suitable light guide. The external light source may be located within the processing chamber of the tool, or it may be external to the processing chamber. Additionally, there may be one or more light sources within the sensor apparatus that each are connected to light guiding elements in order to guide the light to other portions of the sensor apparatus.

Aspects of the present disclosure include a device that is built on a production substrate. The production substrate may be divided into one or more active device dice and one or more monitor dice. The active device dice may have functioning devices being built on them. The monitor dice may have material layer thickness monitors built on them. The presence of the material layer thickness monitors may provide additional information about the processing conditions that the functioning devices were exposed to, thereby allowing for better process control and a higher yield.

Figure 1B:
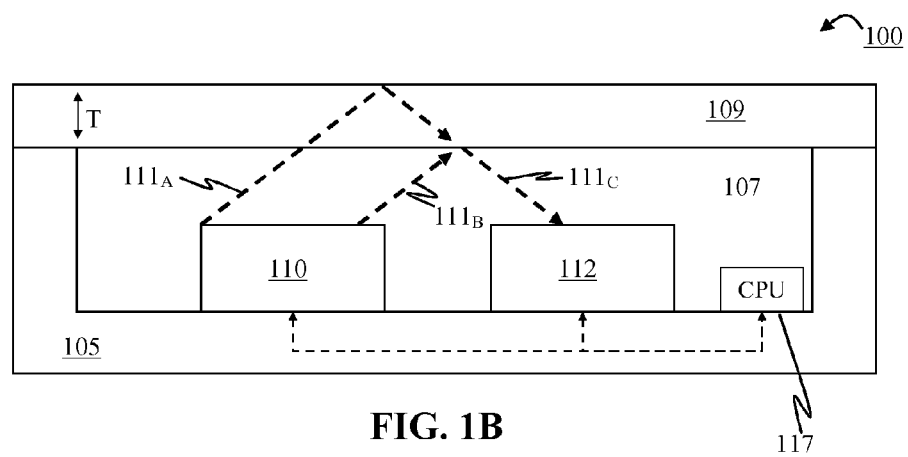
FIG. 1B is a cross-sectional view of the sensor apparatus in FIG. 1A.

FIG. 1A is an overhead view of a sensor apparatus 100. Sensor apparatus 100 may comprise a substrate 105 and a material layer 109 (not shown in FIG. 1A) formed over the substrate 105. By way of example, and not by way of limitation the substrate may be a semiconductor, a glass, or any other similar material. The size and shape of the substrate 105 may be approximately the same size as non-sensor apparatus substrates that are processed using the same processing steps being analyzed. For example, if the processing step being analyzed with sensor apparatus 100 is typically performed on a silicon wafer that has a diameter of 300 mm and a thickness of 0.775 mm, then the sensor wafer should have similar dimensions. One or more cavities 107 may be formed in the substrate 105. FIG. 1B is a cross sectional view of device 100 along dotted line 1B. From this view, the cavities 107 are shown as extending into the top surface of the substrate 105, with the material layer 109 formed above the top surface of the substrate 105.

Returning to FIG. 1A, the cavities 107 may be distributed across the surface of the substrate 105. This arrangement provides multiple locations across the surface for measurements to be taken. In many material processing operations, such as but not limited to CVD, the deposition or etching rates may vary across the surface of the device 100. As such, the use of multiple cavities allows for enhanced data acquisition and the ability to more precisely define how the processing conditions of a given tool will affect device 100. The figures used in the present disclosure depict a single measurement unit in each cavity, but the disclosure should not be so limited. By way of example, there may be a plurality of measurement units in each cavity 107. The cavities 107 in FIG. 1B are arranged in a grid-like pattern, but it should be noted that this is just one of the many possible arrangements. By way of example, and not by way of limitation, the cavities 107 may be preferentially formed in locations where there is typically a high variation in the deposition or etch rates. Also, the number of cavities 107 is also variable. Increasing the number of cavities 107 allows for inclusion of more measurement units, and therefore may provide a more complete characterization of the processing operation. Alternatively coarser measurements may be made when fewer cavities 107 are used. According to aspects of the present disclosure a cavity 107 may also be formed in a production wafer (i.e., a substrate that is being processed in order to fabricate functioning devices). The production substrate may be divided into one or more active device dice and one or more monitor dice. The active device dice may have functioning devices being built on them. The monitor dice may have a cavity 107 with a light source 110 and a photodetector 112 formed in the cavity. The presence of the measurement unit in the production substrate may provide additional information about the processing conditions that the functioning devices were exposed to, thereby allowing for better process control and a higher yield.

Figure 1C:
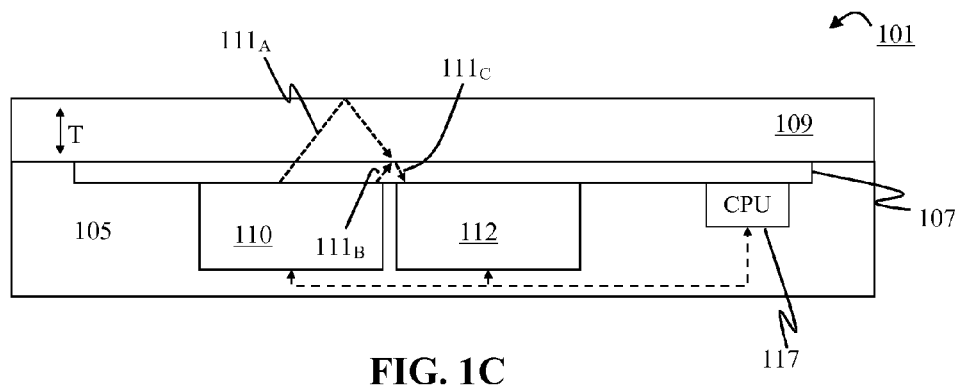
FIG. 1C is a cross-sectional view of a sensor apparatus where the light source and the photodetector are fabricated into the substrate according to an aspect of the present disclosure.

The cavities 107 should be formed to a depth that is deeper than the height of a light source 110 and a photodetector 112 which may be located in the bottom of the cavity 107, which in some implementations may be less than about 0.018 inches deep. The depth of the cavities 107 may be reduced if the light source 110 and the photodetector 112 are formed into the surface of the substrate exposed at the bottom of the trench, as shown in FIG. 1C. This configuration may be beneficial when the substrate 105 is a silicon substrate, in which case a light source 110, such as light emitting diode (LED) or a vertical-cavity surface-emitting laser (VCSEL), and the photodetector 112 may be built using standard semiconductor fabrication techniques directly into the substrate.

The thickness T of the material layer may be measured through the use of interferometry. Light from the light source 110 may be directed at the material layer 109. A first portion of the light $111_A$ may be refracted upon an interaction with the bottom surface of the material layer 109. While there may be a change in the angle of the light $111_A$ with respect to the material layer 109 due to the differences in the refractive indices of the material layer and its surrounding, the angle depicted in the figures are omitted for simplicity. The first portion of the light $111_A$ is then reflected off of the top surface of the material layer 109. Upon reaching the bottom surface of the material layer 109 the first portion of the light $111_A$ may pass through the surface and become a component of the measured light $111_C$. A second portion of the light $111_B$ may be reflected by the bottom surface of the material layer 109. The second portion of the light then becomes a second component of the measured light $111_C$. Therefore, the measured light $111_C$ is formed by the superimposition of the first portion $111_A$ and the second portion $111_B$ of the light. Since the first portion of the light $111_A$ has traveled a different distance than the second portion of the light $111_B$ the waveforms of each portion may be out of phase with each other, and therefore will cause interference. The photodetector 112 is configured to detect the interference of the two components. As the thickness of the material layer 109 changes due to the addition or removal of material, the interference pattern will be altered.

Measurement electronics 117 may then be used to analyze the change in the interference pattern with respect to time in order to calculate the rate of change of the thickness of the material layer 109. The measurement electronics 117 may be connected to the light source 110 and the photodetector 112 in order to send and receive data or deliver commands. Those skilled in the art are aware that there are numerous commercially available controllers that are suitable for use with the sensor apparatus 100. By way of example, and not by way of limitation, the measurement electronics 117 may include electronic devices such as microprocessors for analyzing the interference patterns detected by the photodetector 112. Furthermore, the measurement electronics 117 may include computer readable memory for storing data and instructions. Still further, the measurement electronics 117 may be configured for transmitting data and instructions to a second location using methods such as, but not limited to wireless communication, Ethernet, or USB connections. As shown in FIG. 1B, the measurement electronics 117 are formed in a cavity 107. However, aspects of the present disclosure also envision the measurement electronics 117 being located within the substrate 105. Additionally, when the substrate 105 is a semiconductor substrate, the measurement electronics may be fabricated into the substrate using typical semiconductor fabrication techniques, as shown in the cross sectional view of sensor apparatus 101 in FIG. 1C.

Figure 2A:
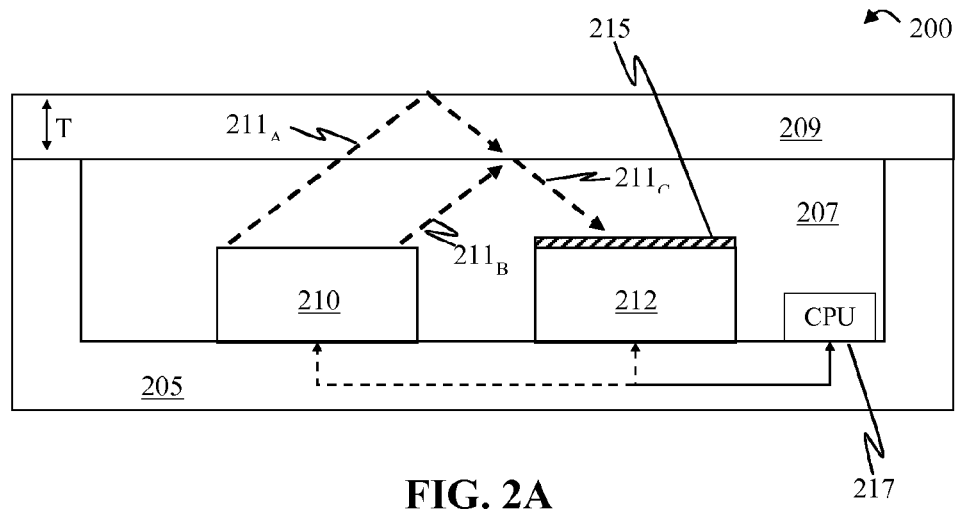
FIG. 2A is a cross-sectional view of a sensor apparatus that includes an optical filter according to an aspect of the present disclosure.

In a processing chamber, the sensor apparatus 200 may be exposed to light or other electromagnetic radiation from sources other than the light source 210 in a cavity 207 of a substrate 205. For example, optical radiation will be present in processes such as plasma etching and CVD. In order to prevent these additional sources of optical radiation from interfering with the analysis of the interference pattern of the measured light $211_C$ resulting from interference of first portion $211_A$ and second portion $211_B$ of light from the light source, the light source 210 should have a narrow bandwidth in order to provide high contrast between the desired interference signal and noise. Light sources 210 such as LEDs and lasers have bandwidths that are sufficiently narrow to allow for high contrast. The contrast may also be improved by utilizing a photodetector 212 that is configured to detect only a narrow bandwidth of wavelengths. Additionally, as shown in FIG. 2A an optical filter 215 may also be used. The filter 215 ensures that only optical radiation of a predetermined that falls within a predetermined bandwidth will be detected by the photodetector 212. The filter may be placed between the photodetector and the material layer, such that substantially all of the light detected by the photodetector 212 passes through the filter 215.

Figure 2B:
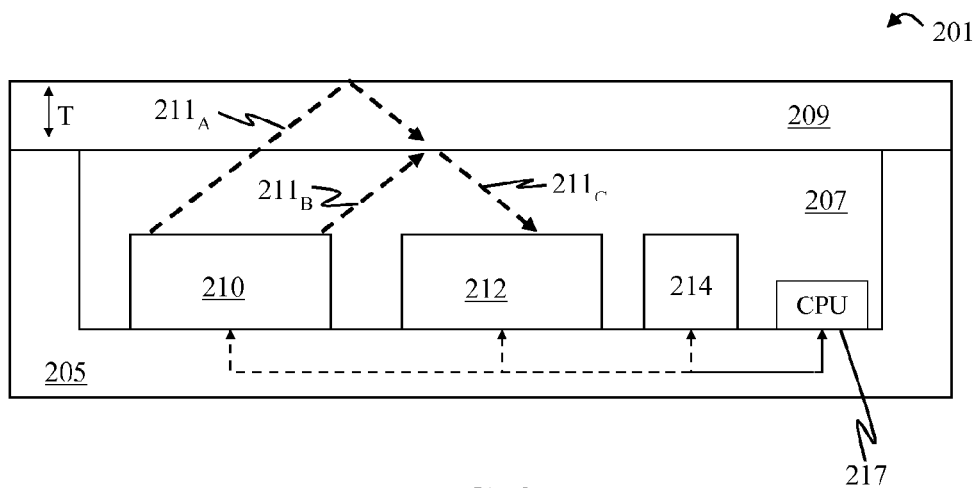
FIG. 2B is a cross-sectional view of a sensor apparatus that includes a temperature apparatus according to an aspect of the present disclosure.

Material deposition and removal processes are often performed at elevated temperatures. Therefore, thermal expansion of the material layer 209 should preferably be accounted for when the processing conditions utilize temperatures above room temperature. According to aspects of the present disclosure, a temperature sensor 214 may be incorporated into the sensor apparatus 100 for calibration purposes, as shown in FIG. 2B. By way of example, and not by way of limitation, the temperature sensor 214 may be a thermocouple, a resistance temperature detector (RTD), or an integrated circuit temperature sensor. The measurement electronics 217 are connected to the temperature sensor 214 in order to allow the temperature data to be sent to the measurement electronics and incorporated into the analysis of the change in the thickness T of the material layer. The measurement electronics 217 may have thermal expansion coefficients for each material that may be used as the material layer 209 stored in a memory. When determining the rate of change of the thickness, the thermal expansion may then be incorporated into the calculation. In some implementations the thermal sensor 214 may be configured to measure the temperature of the substrate 205 if configuration of the sensor apparatus is such that the substrate temperature can be considered to be close enough to the temperature of the material layer 209. Alternatively, if the material layer is formed on a cover 209, the thermal sensor 214 may be put in closer contact with the cover.

Additional aspects of the present disclosure may utilize ellipsometry in order to determine the rate of change of the thickness of the material layer 309. Ellipsometry utilizes polarized light to determine characteristics of a material layer such as the material layer's thickness. The light produced by the light source 310 may be linearly polarized by a polarizer 316 located in a cavity 307 in a substrate 305 along with the light source 310 and photodetector 312. The polarizer 316 polarizes the light in the directions parallel and perpendicular to the plane of incidence. The portion of the light that is polarized in the parallel direction is designated as p-polarized and the light that is polarized in the perpendicular direction is designated as s-polarized. When the light $311_A$, $311_B$ is reflected off of the top or bottom surface of the material layer, the polarization becomes elliptical and the intensity of the light $311_C$ measured by the photodetector 312 may change. This change may be measured as the complex ratio, ρ, of s-polarized and p-polarized reflectances, $r_s$ and $r_p$. The measured values, Ψ and Δ, used to determine the thickness of the material layer 309 are related to ρ by the following equation:

$$\rho = \frac{r_p}{r_s} = \tan(\Psi)e^{i\Delta}$$

Where tan(Ψ) is the amplitude ratio upon reflection, and Δ is the phase shift. Ellipsometry is an accurate and reproducible method for finding the thickness of a thin film because it relies on the measurement of a ratio of two values instead of the absolute value of either. By way of example, and not by way of limitation either a photometric rotating analyzer ellipsometer (RAE) or an photometric rotating polarizer ellipsometer (RPE) may be utilized. In an RAE the values of Ψ and Δ are determined by measuring the intensity at different analyzer rotational azimuth angles. And RPE utilizes essentially the same method to determine the values of Ψ and Δ, with the exception that different azimuth angles of the polarizer are used instead to determine the intensity at different angles.

Figure 3:
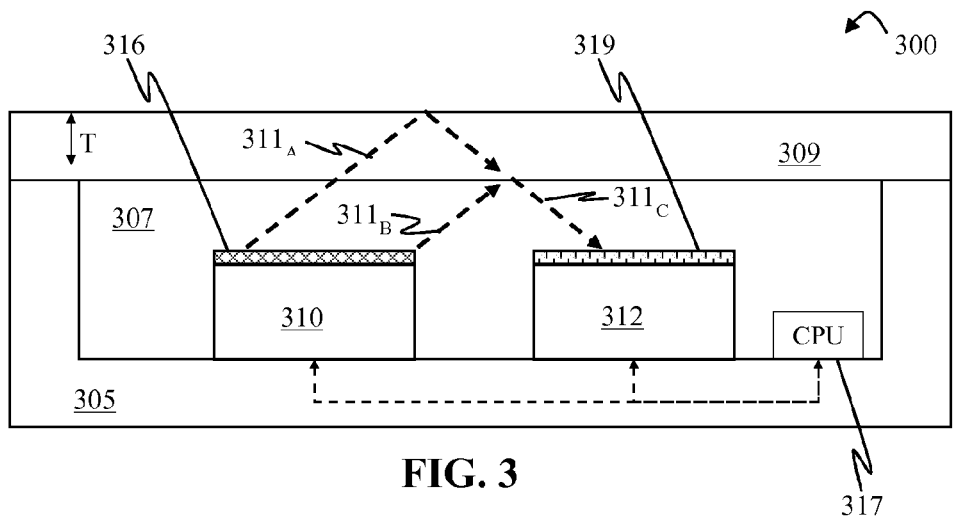
FIG. 3 is a cross-sectional view of a sensor apparatus configured to measure thicknesses with ellipsometry according to an aspect of the present disclosure.

As shown in the cross-sectional view in FIG. 3, the sensor apparatus 300 may also comprise a polarizer 316 and an analyzer 319 in order to allow for ellipsometry measurements to be made. The polarizer 316 may cause the light $311_A$ and $311_B$ to be linearly polarized before it impinges on the material layer 309. Upon reflection off of the top surface or the bottom surface of the material layer 309, the light $311_A$ and $311_B$ become elliptically polarized. The combined light $311_C$ then passes through the analyzer 319 before being received by the photodetector 312. As described above the intensities detected by the photodetector may then be processed by the measurement electronics 317 in order to determine the thickness of the material layer 309. By way of example, and not by way of limitation, if the sensor apparatus 300 is configured to be an RPE, then the rotation of the azimuth angle of the polarizer 316 may be controlled with microelectromechanical system (MEMS) such as micro-motors. If the sensor apparatus 300 is configured to be an RAE, then the then the rotation of the azimuth angle of the analyzer 319 may be controlled with MEMS such as micro-motors.

Alternatively, a polarizer array may be used to provide intensity readings at different discrete polarizations without the need for a either a rotating polarizer or rotating analyzer. By way of example, and not by way of limitation, the light source 310 and photodetector 312 may be implemented as linear arrays having pluralities of discrete elements arrayed perpendicular to the plane of FIG. 3. The polarizer 316 or analyzer 319 may be similarly implemented as an array polarizer having a corresponding plurality of discrete polarizer elements each having a different discrete polarization orientation. Readings of photodetector signal intensity as a function of polarization may be taken simultaneously at each photodetector element in the photodetector array.

Figure 4:
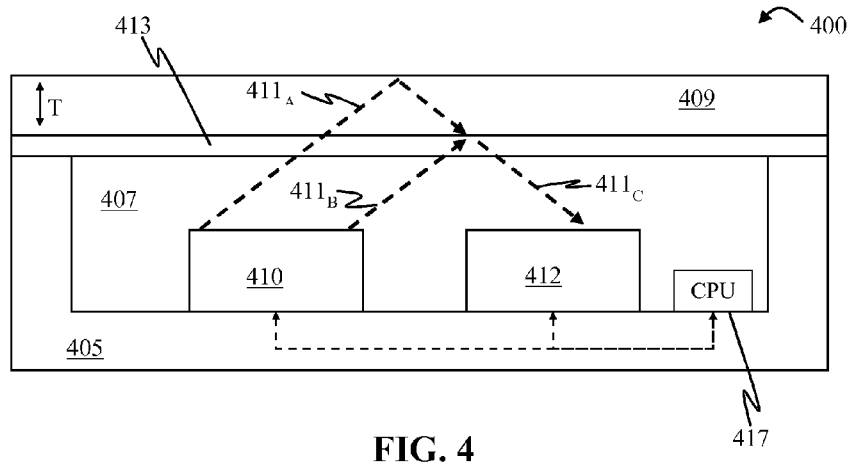
FIG. 4 is a cross-sectional view of a sensor apparatus where the material layer is formed on a top surface of a cover according to an aspect of the present disclosure.

According to additional aspects of the present disclosure, the material layer 409 may be formed on a top surface of a cover 413 located over a cavity 407 in a substrate 405 along with measurement electronics 417. FIG. 4 depicts such a sensor apparatus 400 in which the material layer 409 formed over the cover 413. The cover 413 is made of a material that is transparent to the wavelengths of light $411_C$ from a light source 410 that is detected by the photodetector 412. Since the cover will have a known thickness, the interference of light portions $411_A$, $411_E$ reflecting off of the cover's bottom surface will be known and can be accounted for in the calculations of the thickness of the material layer 409. Forming the material layer 409 over a cover 413 has several benefits. One such benefit is that a single sensor apparatus 400 has the flexibility to measure the rate of change of the thickness of more than one type of material layer 409. In order to change the material in the material layer 409, a first material layer 409 may be etched away completely to leave only the cover 413 behind. Thereafter a second material layer 409 made of a material different than the material used for the first material layer may be disposed on the surface of the cover 413. For example, a sensor apparatus 400 may be used to measure the rate of change of the thickness of the deposition of a material layer 409 made of glass. Thereafter, the glass material layer 409 may be completely removed from the cover, and the same sensor apparatus 400 may be used to measure rate of change of the thickness of a material, such as a PECVD oxide or PECVD nitride grown on the surface of the cover 413. Preferably, the cover 413 will be made of a material on which many different types of thin films may be grown or deposited, such as, but not limited to oxides, glasses, and photoresists.

By way of example, and not by way of limitation, a material that is transparent to the wavelengths of light generally utilized by the photodetector 412 and capable of supporting the growth or deposition of the material layer 409 may be a sapphire material, quartz, glass, nitride or silicon.

The cover 413 also provides a solid surface spanning over the one or more cavities 407. Due to this, a bare cover 413 (i.e., a cover that lacks any portion of the material layer 409 already formed on the top surface) may be used to measure the rate of change of thickness at the initiation of a deposition process. This may provide additional information that would otherwise not be available without the use of the cover, because when no cover 413 is used, a sufficiently thick portion of the material layer 409 must already be spanning the cavity 407 in order to provide a surface on which additional material may be deposited. Additionally, the use of a cover 413 allows for multiple uses of the sensor apparatus 400 when the cover 413 is made from a material that is not etched away with the same etching processes used to remove the material layer 409. In situations where the material layer 409 is etched away during the processing step, a new material layer may be grown on the cover 413 after the processing step has been completed. In situations where the material layer 409 is added during the processing step, such as a material deposition process, then the material layer 409 may be etched away with an etching process after the deposition process has been completed.

Figure 5A:
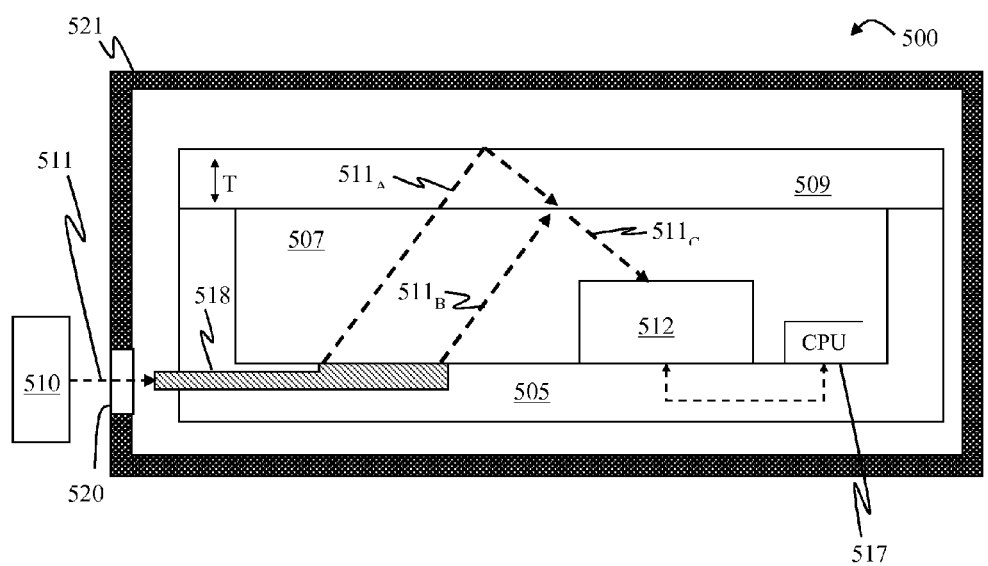
FIGS. 5A-5D depict additional aspects of the present disclosure where a light guiding element is used to guide light from a light source to each measurement unit.
Figure 5B:
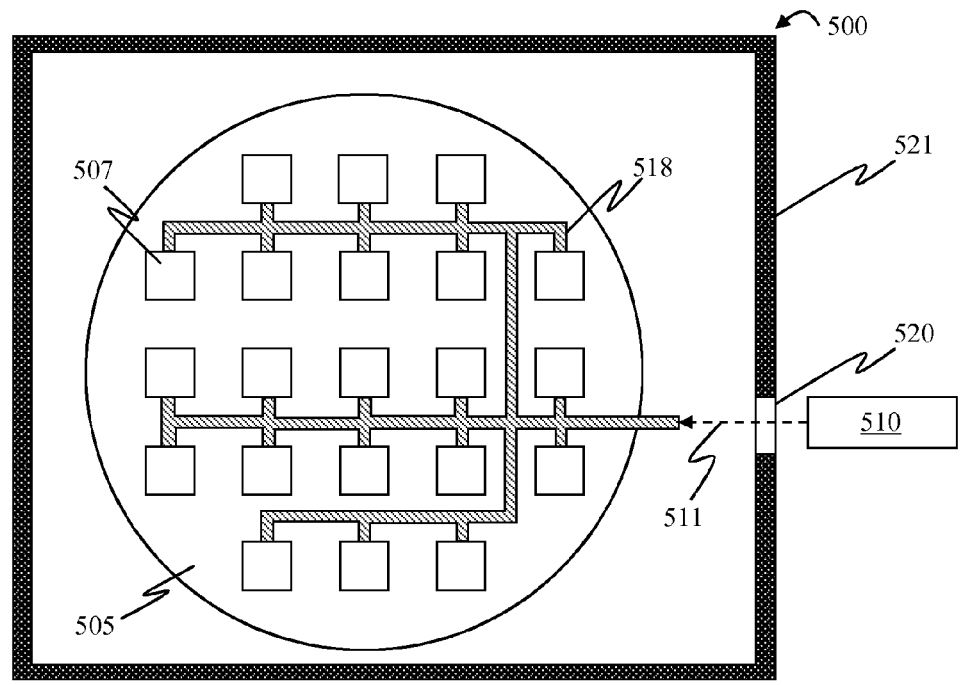

According to an additional aspect of the present disclosure, a sensor apparatus 500 may further comprise a light guiding element 518. FIG. 5A is a cross-sectional view of a sensor apparatus 500 that utilizes a light guiding element 518 in a cavity 507 of a substrate 505 along with measurement electronics 517. The use of a light guiding element 518 allows the light source 510 to be located outside of the cavity 507. The light source 518 may be located within a processing chamber 521 or it may be exterior to the processing chamber 519. By way of example, a window 520 may be formed along a surface of the processing chamber 521. The light source 510 may then be directed through the window 520 such that it is optically coupled with the light guiding element 518. The light guiding element 518 may guide the light 511 into one or more cavities 507, as shown in FIG. 5B. The light 511 may then exit the light guiding element, impinge upon the material layer 509, and reflect back to the photodetector 512 in a substantially similar way as described with respect to the light 511 in FIG. 1B. By way of example, and not by way of limitation, the light guiding element may be a fiber optic cable, or any other suitable structure that will guide the light into the cavities 507 without a significant loss in the intensity of the light. A first portion $511_A$ and a second portion $511_B$ of the light 511 may reflect from the material layer 509 and interfere at the photodetector 512. In order to ensure that the intensity of the resulting light $511_C$ is sufficient to provide a signal to the photodetector 512, the light source may optimally be a laser.

Figure 5C:
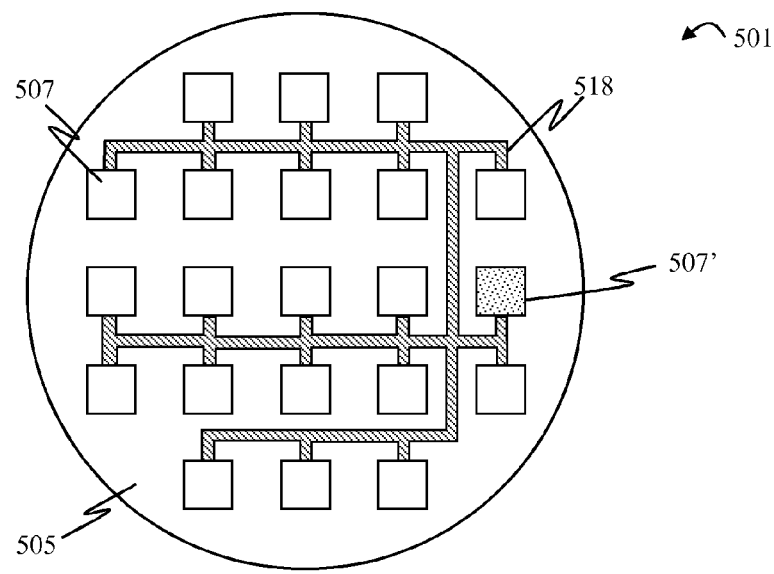
Figure 5D:
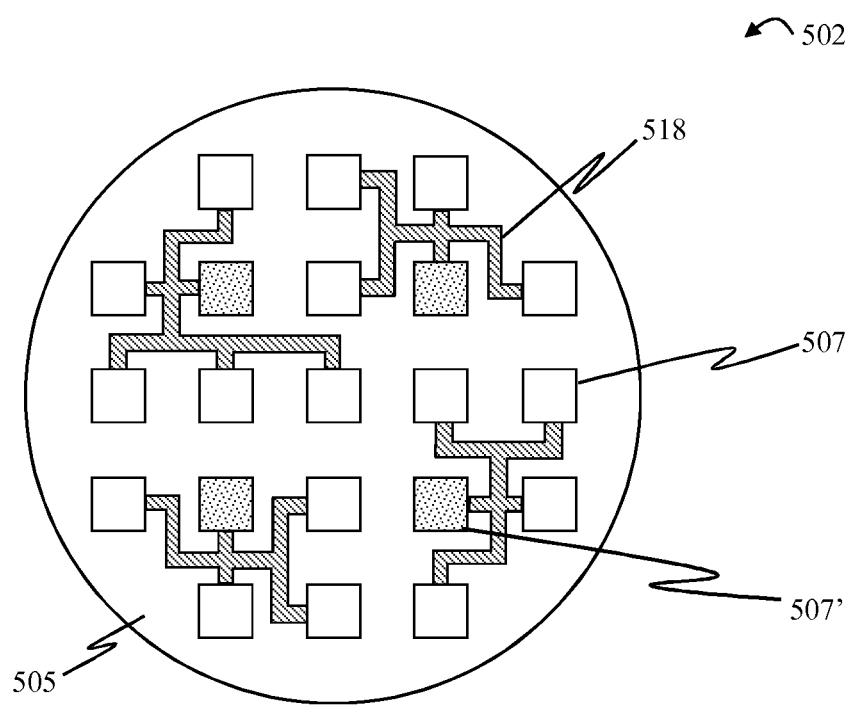

Additionally, a light guiding element 518 may utilize a single light source 510 located within one of a plurality of cavities 507. FIG. 5C is an overhead view of a sensor apparatus 501 according to this aspect of the present disclosure. Cavity 507' is shaded to indicate that a light source 510 is present in the cavity 507' and the remaining cavities 507 are not shaded to indicate that they do not contain their own light source. The light source 510 may be optically coupled with the light guiding element 518, and the light guiding element 518 may route the light 511 produced by the light source 510 to the remainder of the cavities. According to aspects such as this, each measurement unit has a common light source 510 located in cavity 507'. However, it should be noted that there may be any number of light sources 510 optically coupled to light guiding elements 518 that may transmit the light 511 produced to multiple photodetectors 512. FIG. 5D is an illustration of such a sensor apparatus 502. By way of example, and not by way of limitation, there may be four light sources 510, where each light source 510 is located in a cavity 507' and is optically coupled to as separate light guiding element 518 located in different quadrants of the sensor apparatus 502.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for.

What is claimed is:

1. A sensor apparatus, comprising:
   a substrate;
   a material layer over the substrate, wherein the material layer has a top surface and a bottom surface;
   one or more units located between the material layer and the substrate at one or more spatially separated locations, wherein each unit includes at least one light source and at least one corresponding photodetector, wherein the at least one light source is configured to emit or channel light towards the material layer, wherein the at least one light source and at least one corresponding photodetector are configured so that the at least one photodetector detects optical output from the at least one light from the light source interacting with at least the top and bottom surfaces of the material layer for measuring a thickness, a change of thickness or a rate of change of the thickness of the material layer, wherein for each unit both the at least one light source and the at least one photodetector are formed from the substrate, and wherein the sensor apparatus has a thickness similar to that of a standard semiconductor wafer.

2. The sensor apparatus of claim 1, wherein the substrate includes one or more cavities.

3. The sensor apparatus of claim 1, wherein the light source is a light emitting diode.

4. The sensor apparatus of claim 1, wherein the light source is a laser diode.

5. The sensor apparatus of claim 1, wherein the light source includes a light guiding element.

6. The sensor apparatus of claim 1 wherein the substrate is a semiconductor substrate.

7. The sensor apparatus of claim 1 wherein the substrate is a silicon wafer.

8. The sensor apparatus of claim 1 further comprising a processor and memory coupled to the one or more units, wherein one or more of the processor and the memory are formed from the substrate.

9. The sensor apparatus of claim 1, further comprising a temperature sensor configured to determine a temperature of the material layer.

10. The sensor apparatus of claim 1, further comprising a cover disposed over the substrate, wherein the cover is transparent to light of the one or more wavelengths wherein the material layer is formed on the cover.

11. The sensor apparatus of claim 1, further comprising a polarization analyzer disposed between the material layer and the one or more photodetectors.

12. The sensor apparatus of claim 11, wherein the polarization analyzer includes an array polarizer having a plurality of discrete polarizer elements each discrete polarizer element having a different discrete polarization orientation.

13. The sensor apparatus of claim 1, further comprising an optical filter disposed between the material layer and the one or more photodetectors.

14. The sensor apparatus of claim 1, wherein at least one of the one or more units includes a single light source and a single corresponding photodetector.

15. A method for measuring a thickness, a change of thickness or a rate of change of the thickness of a material layer on a substrate, the method comprising:
   measuring optical characteristics at one or more wavelengths of light that impinges on a top surface and a bottom surface of a material layer with one or more photodetectors located between the substrate and the material layer, wherein a sensing device comprising the one or more photodetectors and the substrate has a thickness similar to that of a standard semiconductor wafer, and wherein one or more of the one or more photodetectors are formed from the substrate; and
   determining a thickness, a change of thickness and/or a rate of change of thickness of the material layer from measurement of the optical characteristics of light impinging on the top and bottom surface of the material layer.

16. The method of claim 15, comprising determining a thickness, a change of thickness or a rate of change of thickness of the material layer from measurement of the optical polarization.

17. The method of claim 15, further comprising emitting or channeling light having a predetermined bandwidth from a light source located within a cavity in the substrate, wherein the material layer is transparent to the one or more wavelengths of the light from the light source, wherein the one or more photodetectors are configured to detect optical output from the light from the light source interacting with at least the top surface and the bottom surface of the material layer.

18. The method of claim 15, wherein the material layer is formed on a cover that is transparent to light of the one or more wavelengths.

* * * * *